US007706027B2

(12) United States Patent
Okabe et al.

(10) Patent No.: US 7,706,027 B2
(45) Date of Patent: Apr. 27, 2010

(54) PRINT MANAGEMENT SYSTEM AND PRINT MANAGEMENT METHOD

(75) Inventors: Hiroki Okabe, Nagano-ken (JP); Nobuhisa Takabayashi, Nagano-ken (JP); Mikiya Shimada, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1329 days.

(21) Appl. No.: 10/816,249

(22) Filed: Mar. 31, 2004

(65) Prior Publication Data

US 2004/0257612 A1 Dec. 23, 2004

(30) Foreign Application Priority Data

Apr. 2, 2003 (JP) ............... 2003-099595

(51) Int. Cl.
*H04N 1/40* (2006.01)
*G06F 3/12* (2006.01)
*G06F 15/173* (2006.01)
*G06K 15/00* (2006.01)

(52) U.S. Cl. ............... 358/462; 358/444; 358/448; 358/1.15; 358/1.16; 709/226

(58) Field of Classification Search ............... 358/518, 358/519, 1.9, 1.15, 448, 1.13, 1.8, 1.12, 1.2, 358/1.14, 1.16; 382/100, 167; 399/26; 348/195; 709/226

See application file for complete search history.

(56) References Cited

U.S. PATENT DOCUMENTS

| | | | | |
|---|---|---|---|---|
| 5,768,483 A | * | 6/1998 | Maniwa et al. ............... | 358/1.15 |
| 5,859,711 A | * | 1/1999 | Barry et al. ............... | 358/296 |
| 5,905,906 A | * | 5/1999 | Goffinet et al. ............... | 710/8 |
| 6,006,242 A | * | 12/1999 | Poole et al. ............... | 715/209 |
| 6,115,132 A | * | 9/2000 | Nakatsuma et al. ............... | 358/1.14 |
| 6,157,465 A | * | 12/2000 | Suda et al. ............... | 358/407 |
| 6,348,971 B2 | * | 2/2002 | Owa et al. ............... | 358/1.15 |

(Continued)

OTHER PUBLICATIONS

ASCII24 Website content entitled "Print Alley System," retrieved from the Internet on Mar. 12, 2003 (URL: http://ascii24.com/news/i/net/article/2000/04/06/608187-000.html) (with partial English translation), Transaltion Not Received From Applicant.

(Continued)

*Primary Examiner*—Twyler L Haskins
*Assistant Examiner*—Jonathan R Beckley
(74) *Attorney, Agent, or Firm*—Martine Penilla & Gencarella, LLP

(57) ABSTRACT

Each print job received from a client computer 30 is divided into minimum printing units as divisional jobs, which are stored in a job folder 23*b*. When either of an upper spooler 23*d* and a lower spooler 23*e* has any vacancy for next allocation, one divisional job is allocated to a printer corresponding to the spooler having the vacancy. The name of the printer that has received allocation of the divisional job is written into the job folder 23*b*. When any allocated divisional job having an identical image file name and an identical customer ID with those of a current object divisional job is present in the job folder 23*b*, the current object divisional job is allocated to the printer, to which the allocated divisional job has been allocated. This arrangement allocates multiple divisional jobs for printing an identical image demanded from an identical customer to the same printer, thus ensuring substantially equal quality of resulting printed images.

3 Claims, 7 Drawing Sheets

U.S. PATENT DOCUMENTS

| | | | |
|---|---|---|---|
| 6,385,728 B1* | 5/2002 | DeBry | 726/9 |
| 6,452,692 B1* | 9/2002 | Yacoub | 358/1.15 |
| 6,476,930 B1* | 11/2002 | Roberts et al. | 358/1.18 |
| 6,476,931 B1* | 11/2002 | Aizikowitz et al. | 358/1.18 |
| 6,477,580 B1* | 11/2002 | Bowman-Amuah | 709/231 |
| 6,498,656 B1* | 12/2002 | Mastie et al. | 358/1.15 |
| 6,504,960 B2* | 1/2003 | Takahashi | 382/305 |
| 6,539,396 B1* | 3/2003 | Bowman-Amuah | 707/103 R |
| 6,578,068 B1* | 6/2003 | Bowman-Amuah | 709/203 |
| 6,597,469 B1* | 7/2003 | Kuroyanagi | 358/1.15 |
| 6,606,165 B1* | 8/2003 | Barry et al. | 358/1.9 |
| 6,615,253 B1* | 9/2003 | Bowman-Amuah | 709/219 |
| 6,628,417 B1* | 9/2003 | Naito et al. | 358/1.15 |
| 6,633,396 B1* | 10/2003 | Barry et al. | 358/1.14 |
| 6,650,431 B1* | 11/2003 | Roberts et al. | 358/1.15 |
| 6,657,702 B1* | 12/2003 | Chui et al. | 355/40 |
| 6,738,151 B1* | 5/2004 | Kato | 358/1.12 |
| 6,775,023 B1* | 8/2004 | Fukunaga et al. | 358/1.15 |
| 6,850,335 B1* | 2/2005 | Barry et al. | 358/1.15 |
| 6,900,902 B1* | 5/2005 | Tanaka | 358/1.13 |
| 6,906,819 B2* | 6/2005 | Katsuda et al. | 358/1.15 |
| 7,038,714 B1* | 5/2006 | Parulski et al. | 348/207.2 |
| 7,046,391 B1* | 5/2006 | Barry et al. | 358/1.9 |
| 7,075,670 B1* | 7/2006 | Koga | 358/1.15 |
| 7,106,461 B2* | 9/2006 | Kakigi et al. | 358/1.12 |
| 7,151,613 B1* | 12/2006 | Ito | 358/1.15 |
| 7,161,707 B1* | 1/2007 | Fukushima et al. | 358/1.6 |
| 7,170,620 B2* | 1/2007 | Gassho et al. | 358/1.15 |
| 7,177,037 B2* | 2/2007 | Johnson | 358/1.15 |
| 7,206,082 B2* | 4/2007 | Barry et al. | 358/1.15 |
| 7,258,498 B2* | 8/2007 | Hatta et al. | 400/62 |
| 7,355,748 B2* | 4/2008 | Arai et al. | 358/1.9 |
| 7,372,589 B2* | 5/2008 | Ohara | 358/1.15 |
| 7,587,468 B2* | 9/2009 | Tenenbaum | 709/217 |
| 2003/0093675 A1* | 5/2003 | Hibino et al. | 713/168 |

OTHER PUBLICATIONS

ASCII24 Website content entitled "Print Alley System," retrieved from the Internet on Mar. 12, 2003 (URL: http://ascii24.com/news/i/net/article/2000/04/06/608187-000.html) (with partial English translation).

* cited by examiner

Fig. 4

Print Management Data

| Job ID | 0028 |
|---|---|
| Customer ID | 0105 |
| ... | ... |
| Page Number | 01 |
| Copy Number | 02 |
| Paper Size | A4 |
| Paper Type | Luster |
| Layout Number | 0 |
| Specified Printer Name | Auto |
| Job Allocation Printer Name | — |
| Image File Name | c¥JOBFOLDER¥dddd.tif |
| Execution Status | Print Queuing |
| ... | ... |

| Job ID 81 | Page 82 | Copy 83 | File Name 84 | Execution Status 85 | Customer ID 86 | Paper Specifications 87 | | Specified Printer Name 88a | Job Allocation Printer Name 88b |
|---|---|---|---|---|---|---|---|---|---|
| | | | | | | Size | Type | | |
| 0028 | 01 | 04 | dddd.tif | ○ | 0105 | A4 | Luster | Auto | — |
| | 01 | 03 | dddd.tif | ○ | 0105 | A4 | Luster | Auto | — |
| | 01 | 02 | dddd.tif | ○ | 0105 | A4 | Luster | Auto | — |
| | 01 | 01 | dddd.tif | ○ | 0105 | A4 | Luster | Auto | — |
| 0027 | 02 | 01 | cccc.tif/aaaa.tif | ○ | 0033 | A4 | Matte | Upper Printer | — |
| 0026 | 01 | 01 | ffff.tif | ⊗ | 0027 | A3 | Matte | Auto | — |
| 0025 | 03 | 01 | aaaa.tif | ● | 0031 | A4 | Luster | Auto | Lower Printer |
| | 02 | 01 | kkkk.tif | ● | 0031 | A4 | Luster | Upper Printer | Upper Printer |
| | 01 | 01 | xxxx.tif | ● | 0031 | A4 | Luster | Auto | Upper Printer |
| 0024 | 01 | 01 | dddd.tif/eeee.tif | ● | 0105 | A4 | Luster | Auto | Lower Printer |
| 0023 | 01 | 01 | yyyy.tif | ● | 0007 | A4 | Matte | Lower Printer | Lower Printer |
| 0022 | 01 | 01 | bbbb.tif | ● | 0012 | A4 | Luster | Auto | Upper Pritner |
| 0021 | 01 | 01 | aaaa.tif | ● | 0031 | A4 | Luster | Lower Priner | Lower Printer |

Update — 89

○ : Printing   ◌ : Print Queuing   ⊗ : Pause   ● : Printed
◐ : Standby

PRINT MANAGEMENT SYSTEM AND PRINT MANAGEMENT METHOD

BACKGROUND OF THE INVENTION

1. Field of the Invention

The present invention relates to a print management system and a print management method that allocate each print demand to one of multiple printing devices, which print an image on a medium like printing paper.

2. Description of the Prior Art

A print server for controlling multiple printers connected thereto has been proposed as a print management system (see 'Print Alley System' Minolta Co., Ltd. [retrieved on Mar. 12, 2003], the Internet <URL: http://ascii24.com/news/i/net/article/2000/04/06/608187-000.html>. This prior art print management system is designed to 'allocate one print job to multiple printers to shorten the total output time of an original including a large number of pages' and 'automatically discriminate color pages from monochromatic pages included in a color/monochromatic original and separately output the color pages and the monochromatic pages to a color printer and a monochromatic printer', so as to attain efficient print management.

When receiving multiple print jobs for printing an identical image multiple times, however, this prior art print management system may allocate the multiple print jobs of the identical image to different printers. Since the respective printers have different color reproduction properties, the reproduced colors of printed images on printing paper are slightly varied among the printers. Especially in the case of printing an identical photographic image with different printers, the customer often unsatisfactorily feels a subtle color difference between resulting prints.

SUMMARY OF THE INVENTION

The print management system and the corresponding print management method of the invention aim to attain color reproduction that gives the customer a less sense of dissatisfaction by adequate allocation of printing requests of a received print demand. The print management system and the corresponding print management method of the invention also aim to ensure efficient allocation of printing requests of a received print demand to multiple printers, simultaneously with attaining color reproduction that gives the customer a less sense of dissatisfaction.

In order to achieve at least part of aforementioned aims, the present invention is constructed as follows.

A first print management system of the present invention is a system that allocates each print demand to one of multiple printing devices, which print an image on a medium like printing paper, the print management system including: a print demand acceptance module that receives a print demand including at least one image printing request; and a print allocation module that, when the received print demand includes plural printing requests for printing an at least partially identical image plural times, allocates the plural printing requests for printing the at least partially identical image plural times to one identical printing device.

The first print management system of the invention receives a print demand including plural printing requests for printing an at least partially identical image plural times, and allocates the plural printing requests for printing the at least partially identical image plural times to one identical printing device. This arrangement effectively prevents the customer from unsatisfactorily feeling a subtle color difference between resulting printed images but desirably gives resulting prints of substantially equal quality. The other printing requests regarding non-identical images are allocated to another printing device. This ensures efficient execution of a large number of print demands.

In accordance with one preferable application of the first print management system of the invention, each of the printing requests included in the print demand has identification information for identifying an image to be printed, and the print allocation module allocates multiple printing requests for printing at least an image having an identical piece of the identification information to one identical printing device. In this application, the identification information may include at least one of a file name of each image, identification information for identifying a digital camera used to record the image, date of recording the image with the digital camera, and a data size of the image.

A second print management system of the invention is a system that allocates each print demand to one of multiple printing devices, which print an image on a medium like printing paper, the print management system including: a print demand acceptance module that receives a print demand; and a print allocation module that, when the received print demand includes a printing request for printing an at least partially identical image with an allocated image of another printing request, which has already been allocated to any of the multiple printing devices, allocates the printing request for printing the at least partially identical image to a relevant printing device, to which the printing request for printing the allocated image has already been allocated.

The second print management system of the invention receives a print demand including a printing request for printing an at least partially identical image with an allocated image of another printing request, which has already been allocated to any of the multiple printing devices, and allocates the printing request for printing the at least partially identical image to a relevant printing device, to which the printing request for printing the allocated image has already been allocated. This arrangement effectively prevents the customer from unsatisfactorily feeling a subtle color difference between resulting printed images but desirably gives resulting prints of substantially equal quality. The other printing requests regarding non-identical images are allocated to another printing device. This ensures efficient execution of a large number of print demands. Here the terminology 'allocated image' represents both an image allocated to and printed by the printing device and an image allocated to but not printed yet by the printing device.

In accordance with one preferable application the second print management system of the invention, each of the printing requests included in the print demand has image identification information for identifying an image to be printed, the print management system further includes an information storage module that stores the image identification information for identifying the allocated image and the relevant printing device, to which the printing request for printing the allocated image has already been allocated, and the print allocation module allocates a printing request for printing an image having an identical piece of the image identification information with the stored image identification information for identifying the allocated image to the stored relevant printing device, to which the printing request for printing the allocated image has already been allocated. In this application, the identification information may include at least one of a file name of each image, identification information for identifying a digital camera used to record the image, date of recording the image with the digital camera, and a data size of the image. Each of the printing requests included in the print demand may have customer identification information for identifying a customer who demands printing of an image, the information storage module may store the customer identification information with regard to the allocated image, and the print allocation module may allocate a printing request for printing an image having an identical piece of the image identification information with the stored image identification information for identifying the allocated image and an identical piece of the customer identification information with the stored customer identification information with regard to the allocated image to the stored relevant printing device, to which the printing request for printing the allocated image has already been allocated.

A third print management system of the present invention is a system that allocates each print demand to one of multiple printing devices, which print an image on a medium like printing paper, the print management system including: a print demand acceptance module that receives a print demand including at least one image printing request with settings of a number of pages and number of copies to be printed; and a print allocation module that allocates the received print demand as a whole or in units of pages to one of the multiple printing devices.

The third print management system of the invention receives a print demand including at least one image printing request with settings of a number of pages and number of copies to be printed, and allocates the received print demand as a whole or in units of pages to one of the multiple printing devices. This arrangement enables plural printing requests specified in one print demand or plural printing requests for printing an identical page to be executed by one identical printing device. This arrangement causes multiple copies of an identical image to be printed by an identical printing device and thereby prevents the customer from unsatisfactorily feeling a subtle color difference between resulting printed images.

In accordance with another application of the invention, the first through the third print management system of the invention further include a printing request number detection module that detects a number of printing requests allocated to each of the multiple printing devices, wherein each of the multiple printing devices accepts allocation of printing requests from the print management system to a preset number and successively executes the preset number of printing requests, and the print allocation module allocates a printing request on the condition that any of the detected numbers of printing requests allocated to the multiple printing devices is less than the preset number. In this case, the print allocation module, when there are plural printing devices having the number of allocated printing requests less than the preset number, may allocate a printing request to the printing device having a less number of allocated printing requests.

The technique of the present invention is not restricted to the print management systems described above, but is also applicable to a corresponding print management method with the print management system.

BRIEF DESCRIPTION OF THE DRAWINGS

FIG. 4 shows one example of print management data;

FIG. 7 shows one example of a job execution status display window 80.

DESCRIPTION OF THE PREFERRED EMBODIMENTS

Figure 1:
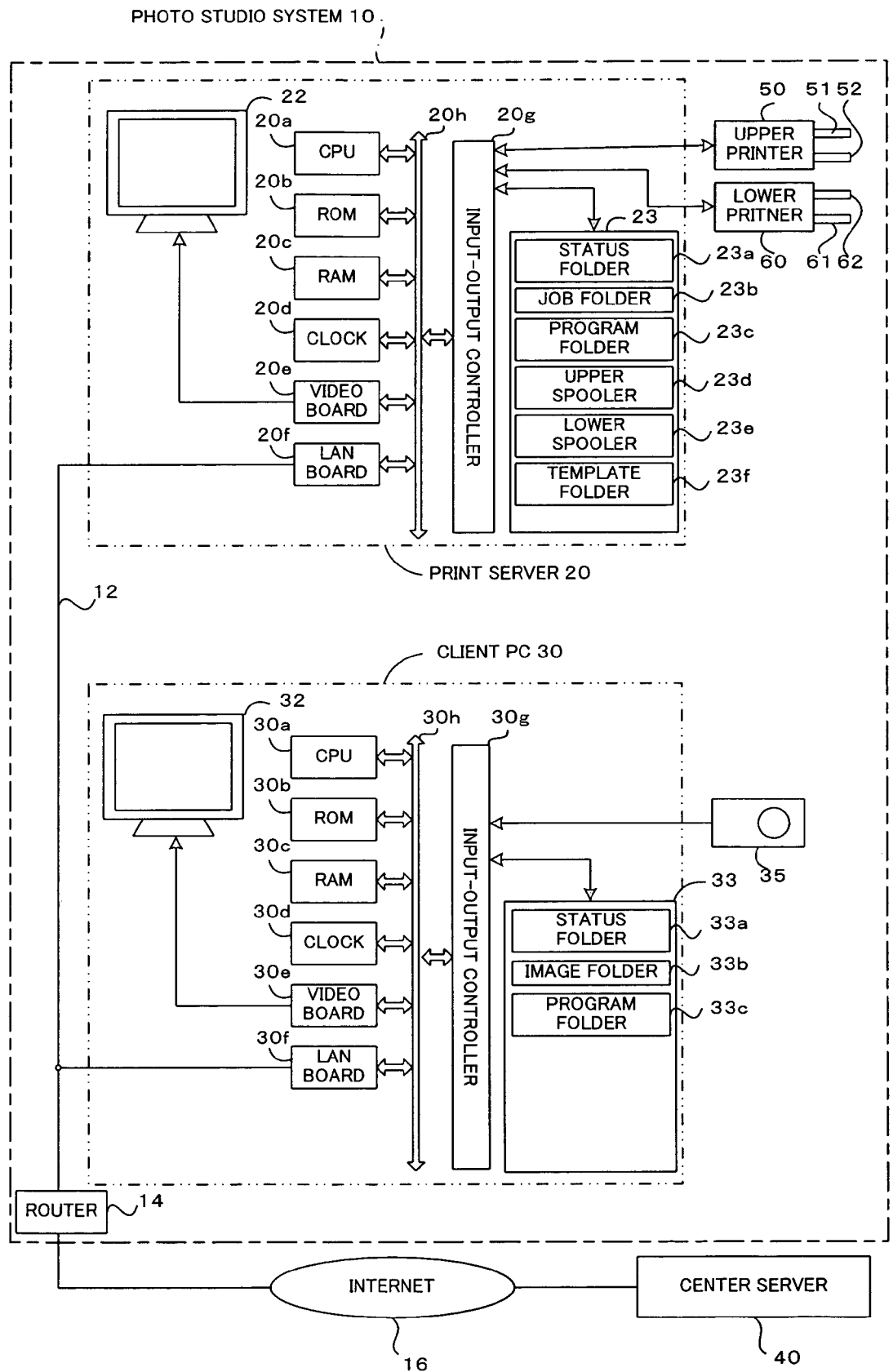
FIG. 1 schematically illustrates the configuration of a photo studio system 10 in one embodiment of the invention.

One mode of carrying out the invention is discussed below as a preferred embodiment. FIG. 1 schematically illustrates the configuration of a photo studio system 10 in one embodiment of the invention. The photo studio system 10 includes two printers 50 and 60 (hereafter may be referred to as the upper printer 50 and the lower printer 60), a print server 20 that is linked with the two printers 50 and 60 and functions as a print management apparatus of the embodiment, and multiple client computers 30 that output print jobs to the print server 20. The multiple client computers 30 are connected with the print server 20 via a LAN 12. The photo studio systems 10 are respectively located in multiple regions and are under management of a center server 40 connected via the Internet 16.

The print server 20 of the embodiment is constructed as a general computer including a CPU 20a. The CPU 20a is connected via a bus 20h with a ROM 20b that stores various processing programs, a RAM 20c that temporarily stores data, a clock generator 20d that generates an operation clock, a video board 20e that has a connector to a display 22, a LAN board 20f that has a connector to the LAN cable 12, and an input-output controller 20g that is linked with a hard disk 23. The LAN board 20f is connected with a router 14 via the LAN cable 12. The print server 20 of the embodiment gains access to the Internet 16 via the router 14.

The hard disk 23 of the print server 20 has a status folder 23a that stores status data from the printers 50 and 60, a job folder 23b that stores print jobs sent from the client computers 30, and a program folder 23c that stores various processing programs. The hard disk 23 also has an upper spooler 23d and a lower spooler 23e that respectively spool at most two jobs of a minimum printing unit (that is, print data printable on one sheet of printing paper), which are allocated to the upper printer 50 or the lower printer 60 and include a currently executing job. The hard disk 23 further has a template folder 23f that stores layout templates used for laying out one or multiple images on a sheet of printing paper.

The status data stored in the status folder 23a of the hard disk 23 include paper sizes (for example, sizes A4, A3, and A3 long) and paper types (for example, matte and luster) available in the printers 50 and 60, paper sizes and paper types currently set in the printers 50 and 60, ICC profiles of the printers 50 and 60, and numbers of jobs (spool numbers) currently spooled in the upper spooler 23d and the lower spooler 23e.

Each of the print jobs stored in the job folder 23b of the hard disk 23 includes an image file of object image data to be printed, a print management file including description of print management data, and an ICC profile. The print management file includes specifications of a paper size, a paper type, an image layout, and a printer used for printing, the number of pages to be printed, the number of copies to be printed with respect to each page, and the name of the image file including the name of a path representing a storage place of the image file.

The processing programs stored in the program folder 23c of the hard disk 23 include printer drivers executed to control the printers 50 and 60 respectively, a color converter executed to generate a color correction table based on an ICC profile of a selected printer for printing and an ICC profile of object image data and to carry out color correction of the object image data with the generated color correction table, and a Web browser executed to browse various pieces of information.

The two printers 50 and 60 and the print server 20 are placed in an identical casing. In the casing, the printer 50 is located on an upper step and the printer 60 is located on a lower step. The printer 50 located on the upper step has two paper cassettes 51 and 52 and receives a feed of print sheets having the specified paper size and paper type from a selected one of the two paper cassettes 51 and 52 for printing. The printer 60 located on the lower step also has two paper cassettes 61 and 62 and receives a feed of print sheets having the specified paper size and paper type from a selected one of the two paper cassettes 61 and 62 for printing.

Each of the client computers 30 is constructed as a general computer including a CPU 30a. The CPU 30a is connected via a bus 30h with a ROM 30b that stores various processing programs, a RAM 30c that temporarily stores data, a clock generator 30d that generates an operation clock, a video board 30e that has a connector to a display 32, a LAN board 30f that has a connector to the LAN cable 12, and an input-output controller 30g that is linked with a hard disk 33. A peripheral device, such as a digital still camera 35, is connectable with the input-output controller 30g via, for example, a USB interface cable. The LAN board 30f is connected with the router 14 via the LAN cable 12. The client computer 30 gains access to the Internet 16 via the router 14.

The hard disk 33 of the client computer 30 has a status folder 33a that stores status data of the printers 50 and 60 sent from the print server 20 at regular intervals or in response to the operator's demands and information regarding print jobs, an image folder 33b that receives and stores digital images recorded in the digital still camera 35 connected via the USB interface cable, and a program folder 33c that stores various processing programs.

The processing programs stored in the program folder 33c of the hard disk 33 include a photo retouch software program executed to make each digital image stored in the image folder 33b subjected to trimming, correction including elimination of undesired marks and scratches, and enhancement like color adjustment. The hard disk 33 also include a layout editing software program executed to read a selected layout template from the template folder 23f of the hard disk 23 of the print server 20, to lay out one or multiple selected digital images stored in the image folder 33b according to the selected layout template, and to create and output a print job to the print server 20, and a Web browser executed to browse various pages provided by the print server 20 and the center server 40.

The center server 40 is designed to intensively manage the working statuses of the photo studio systems 10 located in multiple regions. The center server 40 receives printing-related information from the print server 20 and each of the client computers 30 via the Internet 16 at regular intervals, stores the received printing-related information in the form of a database, and provides the printing-related information stored in the database in response to demands from the print server 20 and each of the client computers 30.

Figure 2:
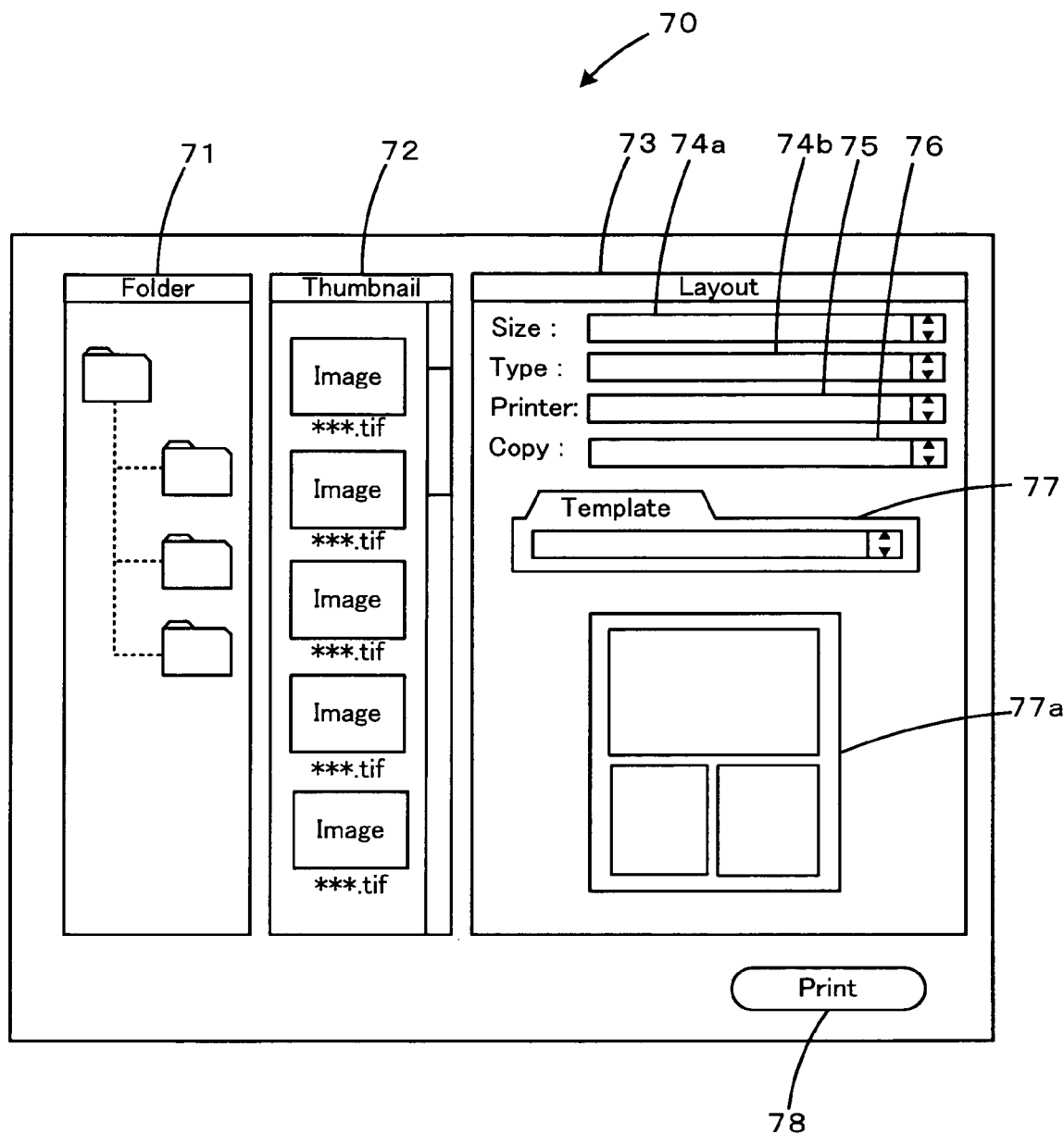
FIG. 2 shows one example of a layout editing window 70.

The discussion now regards the operations of the client computer 30 in the photo studio system 10. In response to connection of the digital still camera 35 to the client computer 30, the operator of the client computer 30 reads image data recorded in the digital still camera 35 and stores the image data into the image folder 33b of the hard disk 33. The client computer 30 activates the photo retouch software program to make image data of each image file stored in the image folder 33b subjected to a series of retouching process in response to the operator's retouching operations. The client computer 30 also activates the layout editing software program to set image data of each image file stored in the image folder 33b in a photo frame of a desired layout template in response to the operator's layout operations and to create and output a print job of the image data in the desired layout to the print server 20 for printing in response to the operator's print command. FIG. 2 shows a layout editing window 70, which is open on the display 32 of the client computer 30 when the layout editing software program is activated.

As shown in FIG. 2, the layout editing window 70 has a folder display field 71 that shows folders stored in the image folder 33b, a thumbnail display field 72 that shows thumbnail images of image files stored in a selected one of the folders displayed in the folder display field 71, a layout operation field 73, and a print button 78. In the layout operation field 73, the operator drags and drops a desired thumbnail image, among those of the image files displayed in the thumbnail display field 72, in a desired photo frame on a selected layout 77a. The operator clicks the print button 78 to give a print command. The layout operation field 73 includes various selection boxes for selection of desired printing conditions: for example, a paper size selection box 74a to select a desired paper size, a paper type selection box 74b to select a desired paper type, a printer specification box 75 to specify a printer used for printing between the two printers 50 and 60 connecting with the print server 20, a copy number selection box 76 to specify the number of copies to be printed with the layout 77a displayed in the layout operation field 73, and a layout selection box 77 to select a desired layout among multiple layout templates. The operator selects a desired condition in a popup menu open on each selection box. In the structure of this embodiment, three options 'upper printer', 'lower printer', 'not specified' are selectable in the printer specification box 75.

On the layout editing window 70, the operator sets a desired one of the thumbnail images displayed in the thumbnail display field 72 in a desired photo frame on the layout 77a selected in the template selection box 77, selects desired printing conditions in the corresponding selection boxes, and clicks the print button 78. The client computer 30 then creates a print job based on the printing conditions selected on the layout editing window 70 and sends the created print job to the print server 20.

Figure 5:
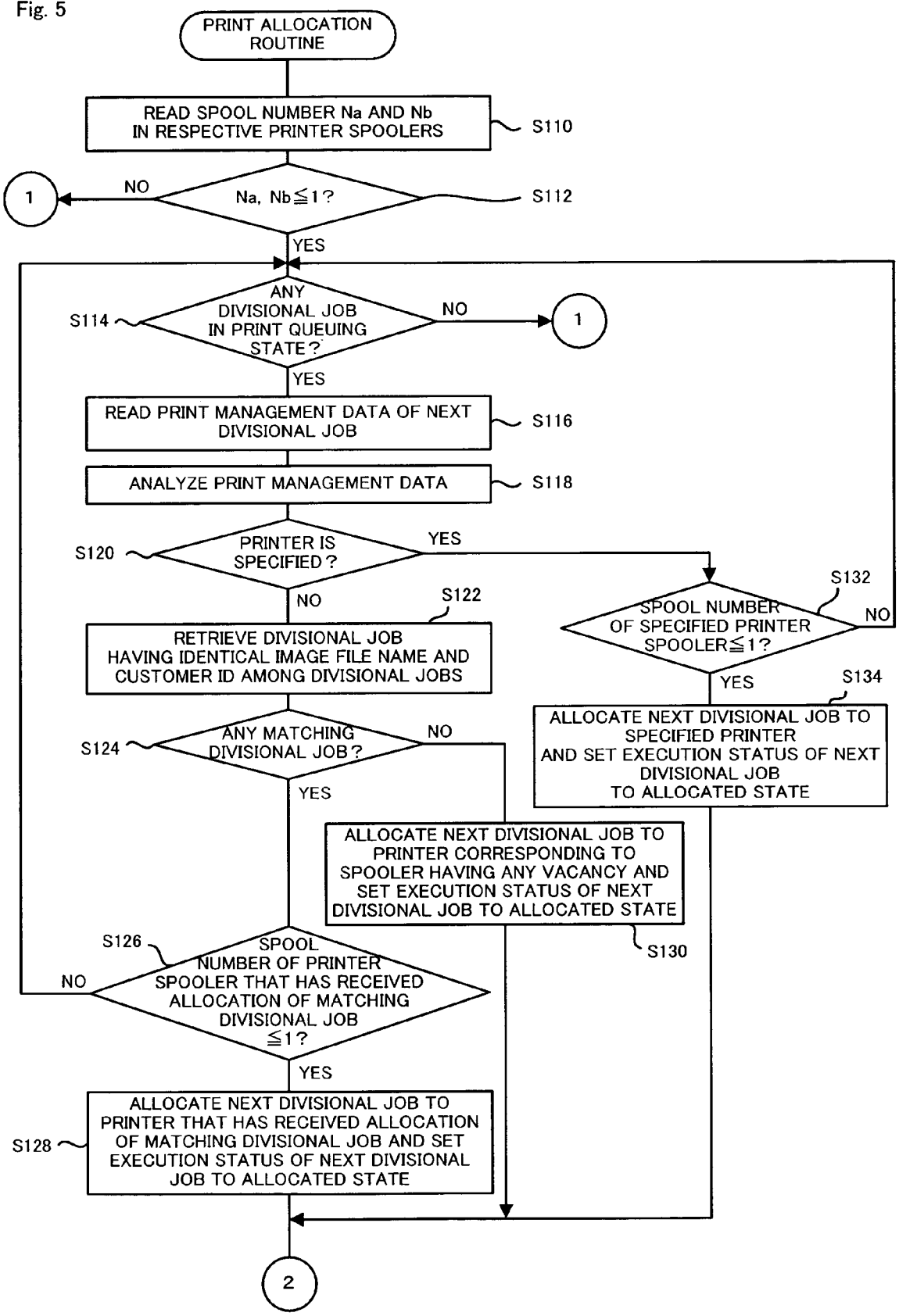
FIGS. 5 and 6 are flowcharts showing a print allocation routine.
Figure 6:
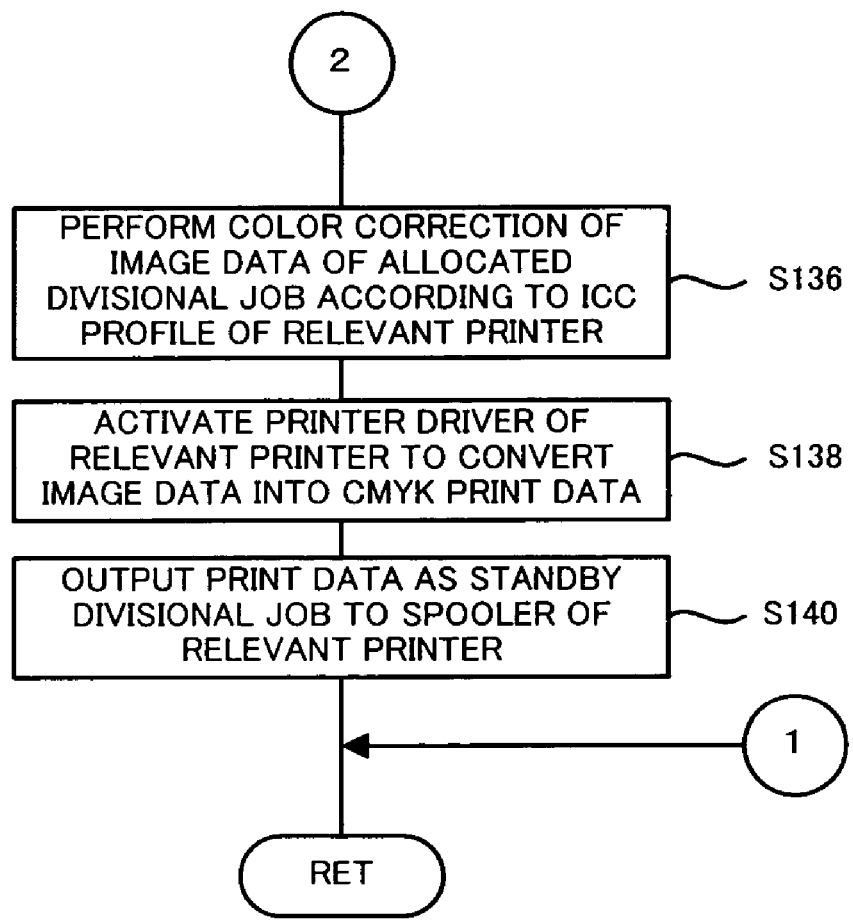

The discussion now regards the operations of the print server 20 in the photo studio system 10. A print job acceptance routine shown in the flowchart of FIG. 3 and a print allocation routine shown in the flowcharts of FIGS. 5 and 6 are described successively as the operations of the print server 20 of the embodiment.

The print job acceptance routine is activated, in response to reception of a signal representing transmission of a print job from one of the client computers 30. When the print job acceptance routine shown in the flowchart of FIG. 3 starts, the CPU 20a of the print server 20 of the embodiment receives a print job sent from the client computer 30 (step S100), allocates a job ID to the received print job in the order of reception (step S102), divides the received print job into minimum printing units (step S104), and stores divisions of the print job (hereafter referred to as divisional jobs) into the job folder 23b of the hard disk 23 (step S106). The print job acceptance routine is then terminated. Here the minimum printing unit corresponds to printing on one sheet of printing paper. The processing of step S106 newly creates a print management file corresponding to each divisional job of the minimum printing unit, based on a print management file included in the print job received at step S100 and stores the newly created print management file into the job folder 23b. When the print job received at step S100 is a job of the minimum printing unit, the print job is not actually divided. Even in this case, the print job going through the processing of step S104 is called the divisional job.

FIG. 4 shows print management data of a print management file created corresponding to a divisional job and stored in the job folder 23b. In the illustrated example of FIG. 4, the print management data includes a 'job ID', a 'customer ID' for identifying the customer of a received print job, a 'page number' for specifying the ordinal page number of the divisional job in the received print job, a 'copy number' for specifying the ordinal copy number of the divisional job in the received print job, a 'paper size', a 'paper type', a 'layout number' for identifying a selected template among the multiple layout templates stored in the template folder 23f, a 'specified printer name', a 'job allocation printer name' for identifying a printer that actually receives the allocated divisional job, an 'image file name' including the name of a path representing a storage place of a corresponding image file, and an 'execution status' of the divisional job. Divisional jobs as divisions of one print job have an identical job ID but are distinguishable by the 'page number' and the 'copy number'. Among the parameters described in the print management file, the 'customer ID', the 'paper size', the 'paper type', the 'layout number', and the 'specified printer name' are set by the client computer 30 in response to the operator's entries. The 'job ID', the 'page number', the 'copy number', the 'job allocation printer name', and the 'execution status' are set by the print server 20 in the course of processing the divisional job. Each of the divisional jobs stored in the job folder 23b is checked for printability at preset time intervals (for example, at every 5 seconds), based on the paper sizes and the paper types currently set in the printers 50 and 60. When the divisional job is determined as printable, a print queuing state is set to the 'execution status' of the divisional job. When the divisional job is determined as unprintable, a pause state is set to the 'execution status' of the divisional job.

The print allocation routine is repeatedly executed at preset time intervals (for example, at every 10 seconds). When the print allocation routine shown in the flowcharts of FIGS. 5 and 6 starts, the CPU 20a of the print server 20 first extracts spool numbers Na and Nb of divisional jobs spooled in the upper spooler 23d and the lower spooler 23e from the status data of the printers 50 and 60 stored in the status folder 23a (step S110), and determines whether both the spool numbers Na and Nb are not greater than a value '1' (step S112). As mentioned previously, each of the upper spooler 23d and the lower spooler 23e is capable of spooling two print data as color-converted CMYK data, which include currently executing print data. The processing of step S112 accordingly determines whether either of the upper spooler 23d and the lower spooler 23e has any vacancy for print data. When it is determined at step S112 that neither of the upper spooler 23d and the lower spooler 23e has any vacancy for print data, allocation of any divisional job is not allowed at the moment. The CPU 20a thus immediately exits from the print allocation routine.

When it is determined at step S112 that either of the upper spooler 23d and the lower spooler 23e has any vacancy for print data, on the other hand, the CPU 20a determines whether there is any divisional job set in a print queuing state in the job folder 23b (step S114). When the job folder 23b includes any divisional job in the print queuing state, the CPU 20a specifies a divisional job in the print queuing state as a next divisional job to be processed next and reads print management data from the print management file corresponding to the next divisional job (step S116). The CPU 20a then analyzes the print management data (step S118), and determines whether a printer used for printing is specified in the print management data (step S120). In the case of no specification of a printer, the CPU 20a retrieves a divisional job having identical 'image file name' and 'customer ID' with those of the next divisional job, among divisional jobs set either in an allocated state or a printed state to the 'execution status' of the print management data (step S122) and determines whether there is any matching divisional job having the identical 'image file name' and 'customer ID' (step S124). When any matching divisional job is present at step S124, the CPU 20a subsequently determines whether the spool number of the spooler corresponding to the printer, to which the matching divisional job has been allocated, is not greater than 1 (step S126). This determines whether the corresponding spooler has any vacancy for print data. When the spooler has any vacancy for print data, the CPU 20a allocates the next divisional job to the printer, to which the matching divisional job has been allocated, and sets the execution status of the next divisional job to an allocated state (step S128). When the divisional jobs allocated previously to either of the printers 50 and 60 include a matching divisional job having the identical 'customer ID' and 'image file name' with those of the next divisional job, the next divisional job is to be printed by the printer, to which the matching divisional job has been allocated (job allocation printer name). The reproduced colors of printed images on printing paper are slightly varied among the printers. Allocation of print jobs of an identical image demanded by an identical customer to different printers often causes the customer to unsatisfactorily feel a subtle color difference between resulting prints. An identical printer is thus used to print multiple copies of an identical image or to reprint a new copy of an image that has been printed in the past by the printer. This desirably gives resulting prints of substantially equal quality. In the case of a layout of multiple images on one sheet of printing paper, the procedure of this embodiment allocates the next divisional job to the printer, which has been used to print a divisional job having the identical 'customer ID' and at least one identical 'image file name' with those of the next divisional job. When the next divisional job is allocated to the relevant printer, the CPU 20a writes the name of the printer that has received the allocation as the 'job allocation printer name' in the print management file, simultaneously with setting the execution status of the next divisional job to the allocated state.

When there is any matching divisional job having the identical 'image file name' and 'customer ID' with those of the next divisional job at step S124 but the spool number of the spooler corresponding to the printer, to which the matching divisional job has been allocated, is greater than 1 at step S126, allocation of any divisional job is not allowed at the moment. The print allocation routine accordingly returns to step S114.

When there is no matching divisional job having the identical 'image file name' and 'customer ID' at step S124, on the other hand, the CPU 20a allocates the next divisional job to the printer corresponding to the spooler having any vacancy for print data and sets the execution status of the next divisional job to the allocated state (step S130). The processing of step S130 writes the name of the printer that has received the allocation as the 'job allocation printer name' in the print management file, simultaneously with setting the execution status of the next divisional job to the allocated state.

When it is determined at step S120 that a printer used for printing is specified in the print management data of the next divisional job, the CPU 20a determines whether the spool number of the spooler corresponding to the specified printer is not greater than 1 (step S132). This determines whether the corresponding spooler has any vacancy for print data. When the corresponding spooler has any vacancy for print data, the CPU 20a allocates the next divisional job to the specified printer and sets the execution status of the next divisional job to the allocated state (step S134). The processing of step S134 also writes the name of the printer that has received the allocation as the 'job allocation printer name' in the print management file, simultaneously with setting the execution status of the next divisional job to the allocated state. When the corresponding spooler has no vacancy for print data at step S132, on the other hand, allocation of any divisional job is not allowed at the moment. The print allocation routine accordingly returns to step S114.

After allocation of the next divisional job to the relevant printer, the CPU 20a performs color correction of the image data of the allocated divisional job according to the ICC profile of the relevant printer (step S136). The printer driver of the relevant printer, which has received the allocation of the divisional job, is activated to make the color-converted image data subjected to color conversion into CMYK color data and a halftoning process and thereby convert the image data into print data processable by the relevant printer (step S138). The print data is then output as a standby divisional job to the spooler corresponding to the relevant printer that has received the allocation of the divisional job (step S140). The print allocation routine is terminated here. On completion of a currently executing divisional job, the upper spooler 23d or the lower spooler 23e outputs print data spooled therein as a standby divisional job to the corresponding one of the printers 50 and 60 to start printing. The execution status of the divisional job is then changed from the allocated state to a printing state. On completion of execution of the divisional job, the execution status of the completed divisional job is changed from the printing state to a printed state.

The execution statuses of the respective divisional jobs are provided in the form of a Web page, in response to a request from the print server 20 or each of the client computers 30. FIG. 7 shows a job execution status display window 80 opening on the display 22 of the print server 20 or on the display 32 of the client computer 30. The job execution status display window 80 includes a job ID display column 81 showing job IDs allocated to respective print jobs, a page number display column 82 showing ordinal page numbers of respective divisional jobs having an identical job ID, a copy number display column 83 showing ordinal copy numbers of the respective divisional jobs having the identical job ID, a file name display column 84 showing the names of image files to be printed as the respective divisional jobs, an execution status display column 85 showing execution statuses of the respective divisional jobs, a customer ID display column 86 showing customer IDs of the respective print jobs, a paper specifications display column 87 showing specifications of paper size and paper type in the respective divisional jobs, a specified printer name display column 88a showing the names of specified printers, a job allocation printer name display column 88b showing the names of printers to which divisional jobs have actually been allocated, and an 'update' button 89 to effectuate the operator's new selections and entries. For the better understanding, different symbols of 'Printing' state, 'Standby' state, 'Print Queuing' state, 'Pause' state, and 'Printed' state are set corresponding to the 'printing state', the 'allocated state', the 'print queuing state', the 'pause state', and the 'printed state' discussed above and are shown in the execution status display column 85 of the respective divisional jobs on the job execution status display window 80 of FIG. 7. In the actual display, however, these states are distinctly shown in color lighting: for example, blinking green circle for the 'Printing' state, lighting green circle for the 'Standby' state, lighting yellow circle for the 'Print Queuing' state, lighting orange circle for the 'Pause' state, and lighting black circle for the 'Printed' state. In the case of no specification of a printer, the option 'Auto' is set in the specified printer name display column 88a.

On the job execution status display window 80 of FIG. 7, a print job having a job ID '0025' requires printing each one copy of three pages and is accordingly divided into three divisional jobs. Each of the divisional jobs is identified by the page number and the copy number. With regard to a divisional job having the job ID '0025', a page number '03', and a copy number '01', the image file name to be printed is 'aaaa.tif' and the customer ID is '0031'. These image file name 'aaaa.tif' and customer ID '0031' are identical with those of a matching divisional job having a job ID '0021', a page number '01', and a copy number '01'. The divisional job having the job ID '0025', the page number '03', and the copy number '01' is thus allocated to the 'lower printer', to which the matching divisional job having the job ID '0021', the page number '01', and the copy number '01' has been allocated. With regard to a divisional job having a job ID '0028', a page number '01', and a copy number '01' (first copy), the image file name to be printed is 'dddd.tif' and the customer ID is '0105'. These image file name 'dddd.tif' and customer ID '0105' are identical with part of the image file name 'dddd.tif/eeee.tif' and the customer ID '0105' of a matching divisional job having a job ID '0024', a page number '01', and a copy number '01'. The divisional job having the job ID '0028', the page number '01', and the copy number '01' is thus allocated to the 'lower printer', to which the matching divisional job having the job ID '0024', the page number '01', and the copy number '01' has been allocated. The other divisional jobs of the same job ID '0028' identified by the page number '01' and copy numbers '02' to '04' (second to fourth copies) also have the identical image file name 'dddd.tif' and the identical customer ID '0105' with those of the corresponding divisional job for the first copy. These divisional jobs are thus also allocated to the same 'lower printer'.

As described above, the print server 20 of the embodiment causes an identical printer to be used to print multiple copies of a partly or wholly identical image in response to a demand from one customer or to reprint a new copy of a partly or wholly identical image that has been printed in the past by the printer in response to a demand from the same customer after some time. This effectively prevents the customer from unsatisfactorily feeling a subtle color difference between resulting printed images but desirably gives resulting prints of substantially equal quality. Each of non-identical images is allocated to one of the two printers 50 and 60 having a vacancy. The two printers 50 and 60 are thus efficiently used to print a large number of images.

Figure 3:
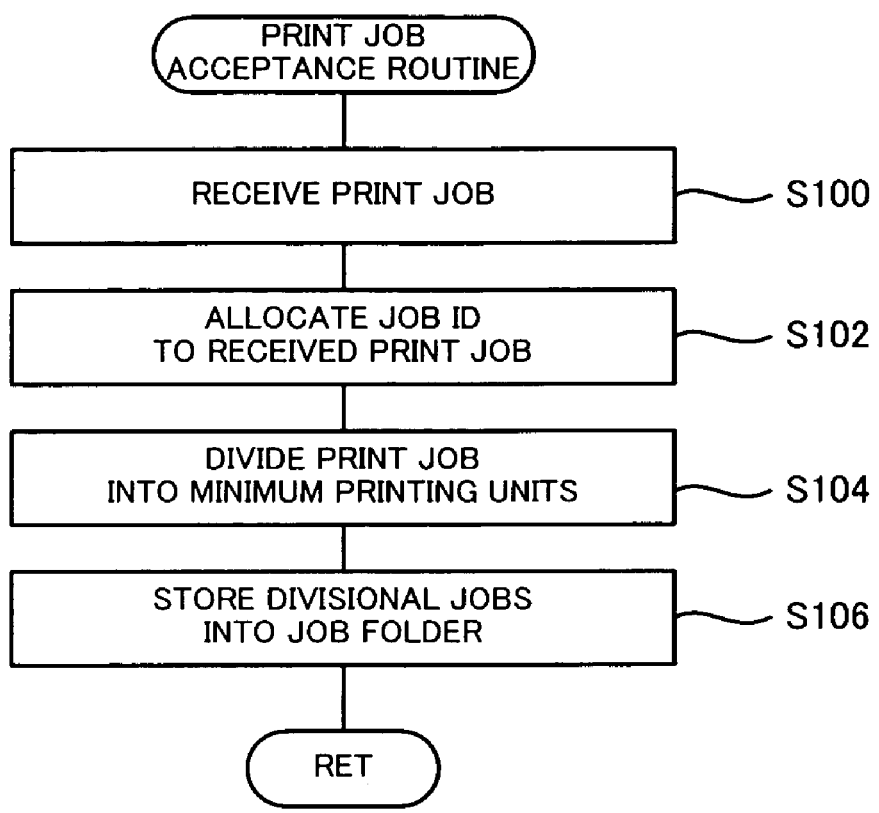
FIG. 3 is a flowchart showing a print job acceptance routine.

The CPU 20a of the print server 20 of the embodiment executing the print job acceptance routine of FIG. 3 corresponds to the print demand acceptance module of the invention. The CPU 20a of the print server 20 executing the print allocation routine of FIGS. 5 and 6 corresponds to the print allocation module of the invention.

The print server 20 of the embodiment causes an identical printer to be used to print matching divisional jobs including at least one identical image among images to be printed on one sheet of printing paper. One possible modification may cause an identical printer to be used to print only perfectly matching divisional jobs including completely identical images to be printed on one sheet of printing paper.

The print server 20 of the embodiment causes an identical printer to be used to print partly or wholly identical images of multiple divisional jobs, when the divisional jobs have an identical 'customer ID'. One possible modification may cause an identical printer to be used to print partly or wholly identical images of multiple divisional jobs, whether the divisional jobs have an identical 'customer ID' or different 'customer IDs'.

The print server 20 of the embodiment uses the image file name as a key to determine the presence of any matching divisional job of a partly or wholly identical image. Any one or any combination of the data size of the image file, the date of recording the image with the digital still camera 35, and the identification information allocated to the digital still camera 35 may be used as a key to determine the presence of any matching divisional job of a partly or wholly identical image.

The print server 20 of the embodiment specifies a printer used for printing among the three options, 'upper printer 50', 'lower printer 60', and 'not specified'. Each print job may be allocated in the 'unit of job' or the 'unit of page' to one of the printers, in response to the customer's selection. When the 'unit of job' is selected in the printer specification process, all pages and all copies in one print job having an identical job ID are allocated to one identical printer. When the 'unit of page' is selected in the printer specification process, all copies of an identical page in one print job having an identical job ID are allocated to one identical printer. In the case of allocation in the 'unit of job', the procedure does not divide each received print job in the print job acceptance routine of FIG. 3 and then executes the print allocation routine of FIGS. 5 and 6 in the unit of job. In the case of allocation in the 'unit of page', on the other hand, the procedure divides each received print job into pages in the print job acceptance routine of FIG. 3 and then executes the print allocation routine of FIGS. 5 and 6 in the unit of page.

In the print server 20 of the embodiment, each of the upper spooler 23d and the lower spooler 23e has the capacity of spooling at most two print data including currently executed print data. The number of print data spooled simultaneously may be only one or any number of not less than 3. In the latter case, each divisional job may be allocated preferentially to a printer corresponding to a spooler having the smaller spool number between Na and Nb in the print allocation routine of FIG. 5. This arrangement further enhances the efficiency of job execution.

In the structure of the embodiment, the print server 20 executes the series of processing to allocate partly or wholly identical images to an identical printer for printing. The client computer 30 may take over part of the processing. For example, in response to a click of the print button 78 on the layout editing window 70, the client computer 30 reads the print management data stored in the job folder 23b of the print server 20, and retrieves any matching divisional job having an identical 'image file name' and an identical 'customer ID' among divisional jobs having the 'execution status' set to the 'allocated state' or the 'printed state', based on the 'execution status', the 'image file name', the 'customer ID', and the 'job allocation printer name' of the print management data. When any matching divisional job is present, the client computer 30 creates a print job including specification of the same printer as the job allocation printer name (the printer to which the matching divisional job has been allocated) and outputs the created print job to the print server 20.

In the above embodiment, the technique of the present invention is applied to the print server 20 that functions as a print management system. The technique of the invention is also applicable to a print management method in relation to the print management system of the embodiment. Still another application is a program that causes the computer to function as the print management system of the embodiment. In the case of such programs the respective steps of the print job acceptance routine shown in FIG. 3 and the print allocation routine shown in FIGS. 5 and 6 may be programmed in a suitable programming language.

The above embodiment is to be considered in all aspects as illustrative and not restrictive. There may be many modifications, changes, and alterations without departing from the scope or spirit of the main characteristics of the present invention. All changes within the meaning and range of equivalency of the claims are therefore intended to be embraced therein.

What is claimed is:

1. A print management system that allocates each print demand to one of multiple printing devices, which print an image on a medium, said print management system comprising:

a plurality of printing devices;

a print demand acceptance module that receives a plurality of print demands, each print demand includes a printing request of an image, wherein each said printing request included in each print demand has image identification information for identifying the image to be printed and has customer identification information for identifying a customer who demands printing of the image, said image identification information includes at least one of a file name of the image, identification information for identifying a digital camera used to record the image, date of recording the image with the digital camera, and a data size of the image;

a print allocation module that receives print demands from said print demand acceptance module, said print allocation module, in response to a received print demand, which is a second print demand including a printing request of an image, said image is the same image as a first image of a first printing request of a first print demand, wherein the first image has previously been allocated to a given printing device of the plurality of printing devices, retrieves a matching print demand among a plurality of print demands in an allocated state or a printed state, said matching print demand is, or identical to, the first print demand, wherein the matching print demand includes an identical image with the image of the printing request of the received print demand, said print allocation module determines a state of a spooler of a printing device, to which the matching print demand has been allocated, said print allocation module allocates the received print demand to the printing device when the spooler has any vacancy, while, in a case when the spooler has no vacancy, waits to allocate the received print demand to the printing device after a vacancy occurs in the spooler, said print allocation module sets the status of the received and allocated print demand to the allocated state;

an information storage module that stores image identification information and customer identification information of printing requests when a printing request to print an image has been allocated so to identify the image and printing device to which image of the printing request of a print demand has been allocated; and a printing request number detection module that detects a number of printing requests allocated to each of the plurality of printing devices, wherein each of the plurality of printing devices accepts allocation of printing requests from said print allocation module to a preset number and successively executes the preset number of printing requests, said print allocation module allocates the received print demand to the printing device when printing request of the received print demand includes a piece of image identification which is identical to a stored image identification of the matching printing demand and a piece of customer identification which is identical to a stored customer identification of the matching print demand, said print allocation module allocates the received print demand on the condition that any of the numbers of printing requests to each of the plurality of printing devices is less than the preset number.

2. A print management system in accordance with claim 1, wherein said print allocation module, when there are plural printing devices having the number of allocated printing requests less than the preset number, allocates a printing request to the printing device having a less number of allocated printing requests.

3. A print management method that allocates each print demand to one of multiple printing devices, which print an image on a medium, said print management method comprising the steps of:

(a) receiving a plurality of print demands, each print demand includes a printing request of an image, wherein each said printing request included in each print demand has image identification information for identifying the image to be printed and has customer identification information for identifying a customer who demands printing of the image, said image identification information includes at least one of a file name of the image, identification information for identifying a digital camera used to record the image, date of recording the image with the digital camera, and a data size of the image;

(b) in response to a received print demand, which is a second print demand including a printing request of an image, said image is the same image as a first image of a first printing request of a first print demand, wherein the first image has previously been allocated to a given printing device of a plurality of printing devices, retrieving a matching print demand among a plurality of print demands in an allocated state or a printed state, said matching print demand is, or identical to, the first print demand, wherein the matching print demand includes an identical image with the image of the printing request of the received print demand, (c) determining a state of a spooler of a printing device, to which the matching print demand has been allocated, (d) allocating the received print demand to the printing device when the spooler has any vacancy, while, in a case when the spooler has no vacancy, waits to allocate the received print demand to the printing device after a vacancy occurs in the spooler, (e) setting the status of the received and allocated print demand to the allocated state;

(f) storing image identification information and customer identification information of printing requests when a printing request to print an image has been allocated so to identify the image and printing device to which image of the printing request of a print demand has been allocated; and (g) detecting a number of printing requests allocated to each of the plurality of printing devices, wherein each of the plurality of printing devices accepts allocation of printing requests from said print allocation module to a preset number and successively executes the preset number of printing requests, said step (d) allocates the received print demand to the printing device when printing request of the received print demand includes a piece of image identification which is identical to a stored image identification of the matching printing demand and a piece of customer identification which is identical to a stored customer identification of the matching print demand, said step (d) allocates the received print demand on the condition that any of the numbers of printing requests to each of the plurality of printing devices is less than the preset number.

* * * * *